United States Patent
Kamon et al.

(10) Patent No.: US 11,398,119 B2
(45) Date of Patent: Jul. 26, 2022

(54) VEHICLE CONTROL SYSTEM

(71) Applicant: HONDA MOTOR CO., LTD., Tokyo (JP)

(72) Inventors: Kunihito Kamon, Wako (JP); Ryohei Kitamura, Wako (JP); Nobuaki Kinoshita, Bangkok (TH)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/045,773

(22) PCT Filed: Apr. 3, 2019

(86) PCT No.: PCT/JP2019/014840
§ 371 (c)(1),
(2) Date: Oct. 7, 2020

(87) PCT Pub. No.: WO2019/198599
PCT Pub. Date: Oct. 17, 2019

(65) Prior Publication Data
US 2021/0158640 A1 May 27, 2021

(30) Foreign Application Priority Data
Apr. 9, 2018 (JP) .............................. JP2018-075031

(51) Int. Cl.
*G07C 9/00* (2020.01)
*B60W 50/12* (2012.01)

(52) U.S. Cl.
CPC ......... *G07C 9/00309* (2013.01); *B60W 50/12* (2013.01); *G07C 2009/00317* (2013.01)

(58) Field of Classification Search
CPC ...................................................... G07C 9/00
See application file for complete search history.

(56) References Cited

U.S. PATENT DOCUMENTS 8,193,921 B2 * 6/2012 Konno ................. B62H 5/02
340/426.17
8,294,559 B2 * 10/2012 Yoshizawa .............. B60R 25/24
340/426.36

(Continued)

FOREIGN PATENT DOCUMENTS

CN         1860052      11/2006
CN       101118661       2/2008

(Continued)

OTHER PUBLICATIONS

International Search Report and Written Opinion for International Application No. PCT/JP2019/014840 dated May 28, 2019, 8 pages.

(Continued)

*Primary Examiner* — K. Wong
(74) *Attorney, Agent, or Firm* — Amin, Turocy & Watson, LLP

(57) ABSTRACT

A control unit (40A) includes an operation state determination unit (43) that determines an operating state of a driving source (21) and a communication state determination unit (46) that determines a communication state between an authentication unit (2) and a remote key (4), and the control unit (40A) disables a starting of the driving source (21) by a driving source starting unit (21a) when the control unit (40A) is in an ON state, the operation state determination unit (43) determines that the driving source (21) is in a non-operating state, and the communication state determination unit (46) determines that communication with the remote key (4) is lost.

12 Claims, 6 Drawing Sheets

(56) References Cited

U.S. PATENT DOCUMENTS

| | | | |
|---|---|---|---|
| 8,825,341 B2 | 9/2014 | Fujime | |
| 9,396,597 B2* | 7/2016 | Yamane | G07C 9/00182 |
| 10,328,900 B1* | 6/2019 | Yakovenko | B60R 25/24 |
| 10,464,528 B2* | 11/2019 | Jun | G07C 9/00309 |
| 10,504,312 B2* | 12/2019 | Turner | H04W 4/029 |
| 10,574,445 B2* | 2/2020 | Agerstam | H04W 12/037 |
| 10,614,644 B2* | 4/2020 | Endo | H04L 9/0891 |
| 2006/0163947 A1 | 7/2006 | Onishi et al. | |
| 2018/0290628 A1* | 10/2018 | Luke | B60R 25/209 |

FOREIGN PATENT DOCUMENTS

| | | |
|---|---|---|
| EP | 3115284 | 1/2017 |
| JP | 2005-104197 | 4/2005 |
| JP | 2006-199168 | 8/2006 |
| JP | 2006-214357 | 8/2006 |
| JP | 2009-196406 | 9/2009 |
| JP | 2014-020208 | 2/2014 |
| JP | 2016-068837 | 5/2016 |
| JP | 2017-019359 | 1/2017 |
| TW | 201704071 | 2/2017 |

OTHER PUBLICATIONS

Taiwanese Office Action for Taiwanese Patent Application No. 108112046 dated Feb. 12, 2020.
Chinese Office Action for Chinese Patent Application No. 201980022716.2 dated Feb. 16, 2022.
Japanese Office Action for Japanese Patent Application No. 2020-513225 dated Apr. 26, 2022.

* cited by examiner

VEHICLE CONTROL SYSTEM

TECHNICAL FIELD

The present invention relates to a vehicle control system.

The present application claims priority based on Japanese Patent Application No. 2018-075031 filed on Apr. 9, 2018, the contents of which are incorporated herein by reference.

BACKGROUND ART

Conventionally, a keyless entry system for a vehicle is known (for example, see Patent Document 1). In this system, a user can unlock and lock a vehicle by approaching or leaving the vehicle while carrying a dedicated remote key.

RELATED ART DOCUMENT

Patent Document

Patent Document 1: Japanese Patent Application, First Publication No. 2005-104197

SUMMARY

Problems to be Solved by the Invention

In the system, each part of the vehicle is generally locked by the following operation. The operation involves a user who possesses a remote key moving away from the vehicle after an ECU is powered off by a main switch and the engine is stopped.

On the other hand, in saddle-type vehicles such as a motorcycle, the engine is stopped by a side stand switch as well as the main switch. In such a case, an event in which each part of the vehicle is not locked may occur. This event occurs when the ECU remains in an ON state even when the user possessing the remote key moves away from the vehicle without turning off the main switch. In this case, since a third party can start the engine, there is a problem in terms of anti-theft performance. Moreover, turning off the main switch when a user moves away from the vehicle has a problem in terms of convenience.

Therefore, an object of the present invention is to improve anti-theft performance and convenience of a vehicle control system that performs authentication by communication between a vehicle and a remote key to control starting of a driving source.

Means for Solving the Problem

As a means for solving the problem, a first aspect of the present invention includes: an authentication unit (2) that performs authentication by communication between a vehicle (11) and a remote key (4) within a prescribed authentication area; a main switch (30) that can be turned on during authentication of the authentication unit (2); a control unit (40A) that enters an ON state when the main switch (30) is turned on to control the vehicle (11); and a driving source starting unit (21a) that starts a driving source (21) of the vehicle (11) when the control unit (40A) is in the ON state, wherein the control unit (40A) includes: an operation state determination unit (43) that determines an operating state of the driving source (21); and a communication state determination unit (46) that determines a communication state between the authentication unit (2) and the remote key (4), wherein the control unit (40A) disables a starting of the driving source (21) by the driving source starting unit (21a) when the control unit (40A) is in the ON state, the operation state determination unit (43) determines that the driving source (21) is in a non-operating state, and the communication state determination unit (46) determines that the communication with the remote key (4) is lost.

According to this configuration, it is possible to prevent the driving source from being started when the remote key is not authenticated due to the user possessing the remote key moving away from the vehicle (exiting the authentication area) even when the control unit is in the ON state while the driving source is temporarily stopped or before starting of the driving source. That is, the starting of the driving source is disabled when the remote key is not authenticated by the authentication unit even when the control unit is not turned off. Therefore, it is possible to prevent the driving source from being started by a third party and improve anti-theft performance and convenience even when the user moves away from the vehicle while the control unit is in the ON state.

According to a second aspect of the present invention, in the above-described first aspect, the control unit (40A) includes a stand use control unit (44) that stops the driving source (21) when a stand (17) for locking the vehicle (11) is used, and the control unit (40A) disables the starting of the driving source (21) by the driving source starting unit (21a) when the stand use control unit (44) stops the driving source (21) and the communication state determination unit (46) determines that the communication with the remote key (4) is lost.

According to this configuration, it is possible to prevent the driving source from being started when the remote key is not authenticated due to the user possessing the remote key moving away from the vehicle while the driving source is stopped due to the use of the stand. Therefore, it is possible to prevent the driving source from being started by a third party and improve anti-theft performance and convenience even when the user moves away from the vehicle with the control unit in the ON state.

According to a third aspect of the present invention, in the above-described first or second aspect, the control unit (40A) enables the starting of the driving source (21) by the driving source starting unit (21a) under a prescribed condition when the communication state determination unit (46) determines that the communication with the remote key (4) is lost during driving of the driving source (21) and the driving source (21) is stopped.

According to this configuration, it is possible to restart the driving source under a prescribed condition even when it is detected that the communication with the remote key is stopped due to falling and loss of the remote key during traveling. Therefore, it is possible to enable restarting of the driving source and improve convenience when the driving source is stopped while loss of the remote key goes unnoticed.

According to a fourth aspect of the present invention, in the above-described third aspect, the control unit (40A) determines whether the communication with the remote key (4) is lost when an operating state of the driving source (21) is equal to or larger than a prescribed value.

According to this configuration, it is possible to alleviate the processing load of the control unit by limiting the fall determination of the remote key to the prescribed value or more corresponding to the traveling of the vehicle. Moreover, it is possible to enhance the reliability of the fall determination of the remote key by distinguishing a situation in which the user possessing the remote key moves away from the vehicle when the vehicle is stopped.

According to a fifth aspect of the present invention, in any one of the above-described first to fourth aspects, the driving source (21) is an internal combustion engine, the control unit (40A) includes an idle stop control unit (45) that automatically stops the internal combustion engine, and the control unit (40A) disables the starting of the driving source (21) by the driving source starting unit (21a) when the operation state determination unit (43) determines that the driving source (21) is in a non-operating state which is not realized by the idle stop control unit (45), and the communication state determination unit (46) determines that the communication with the remote key (4) is lost.

According to this configuration, it is possible to disable the starting of the driving source when the remote key is not authenticated and the internal combustion engine is not in the idle stop state only. In this way, it is possible to provide a satisfactory traveling environment and improve the marketability of the vehicle without disturbing the restarting of the internal combustion engine after the idle stop.

Advantage of the Invention

According to the present invention, it is possible to improve anti-theft performance and convenience of a vehicle control system that performs authentication by communication between a vehicle and a remote key to control starting of a driving source.

DESCRIPTION OF THE EMBODIMENTS

Hereinafter, an embodiment of the present invention will be described with reference to the drawings.

Figure 1:
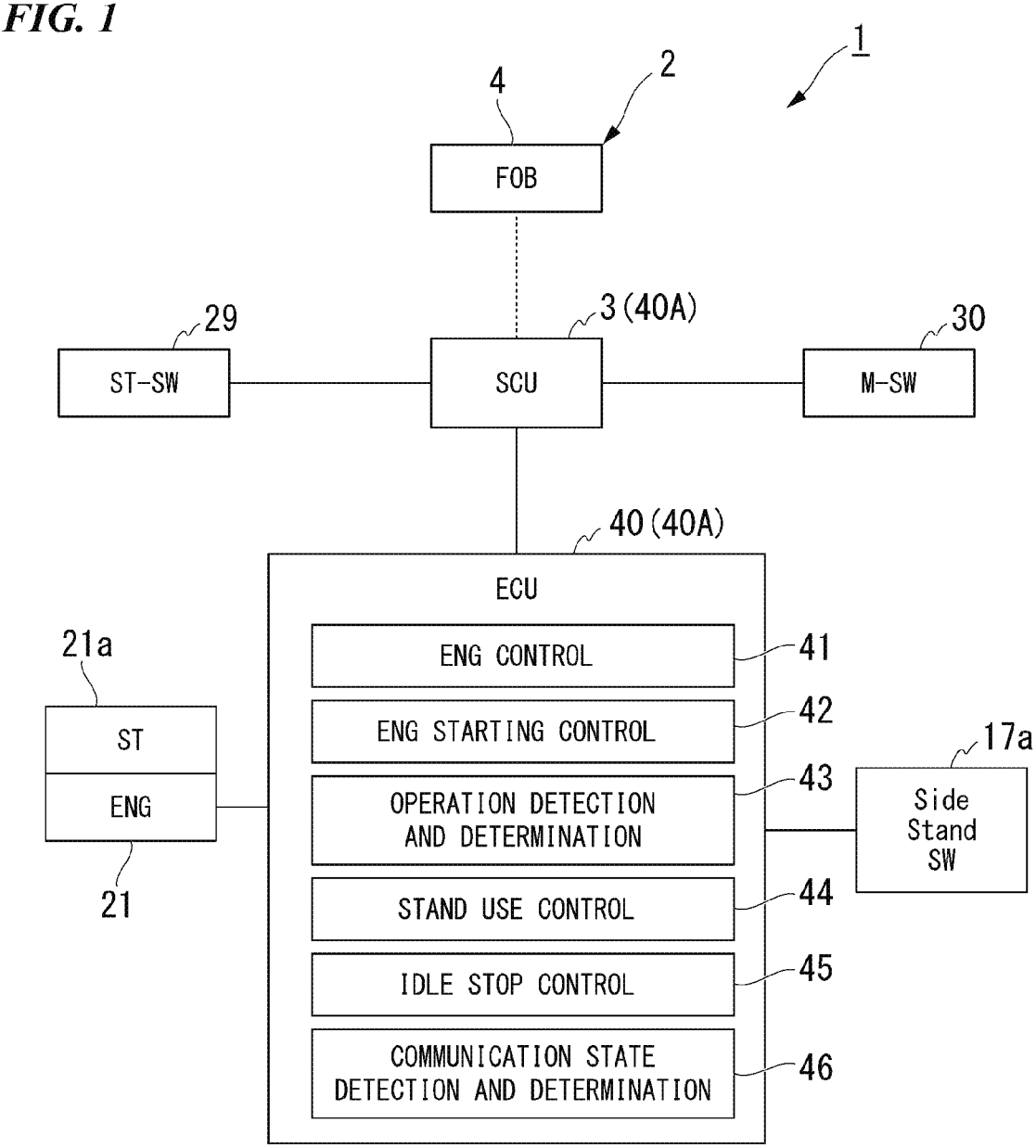
FIG. 1 is a functional block diagram of a vehicle control system according to an embodiment of the present invention.
Figure 2:
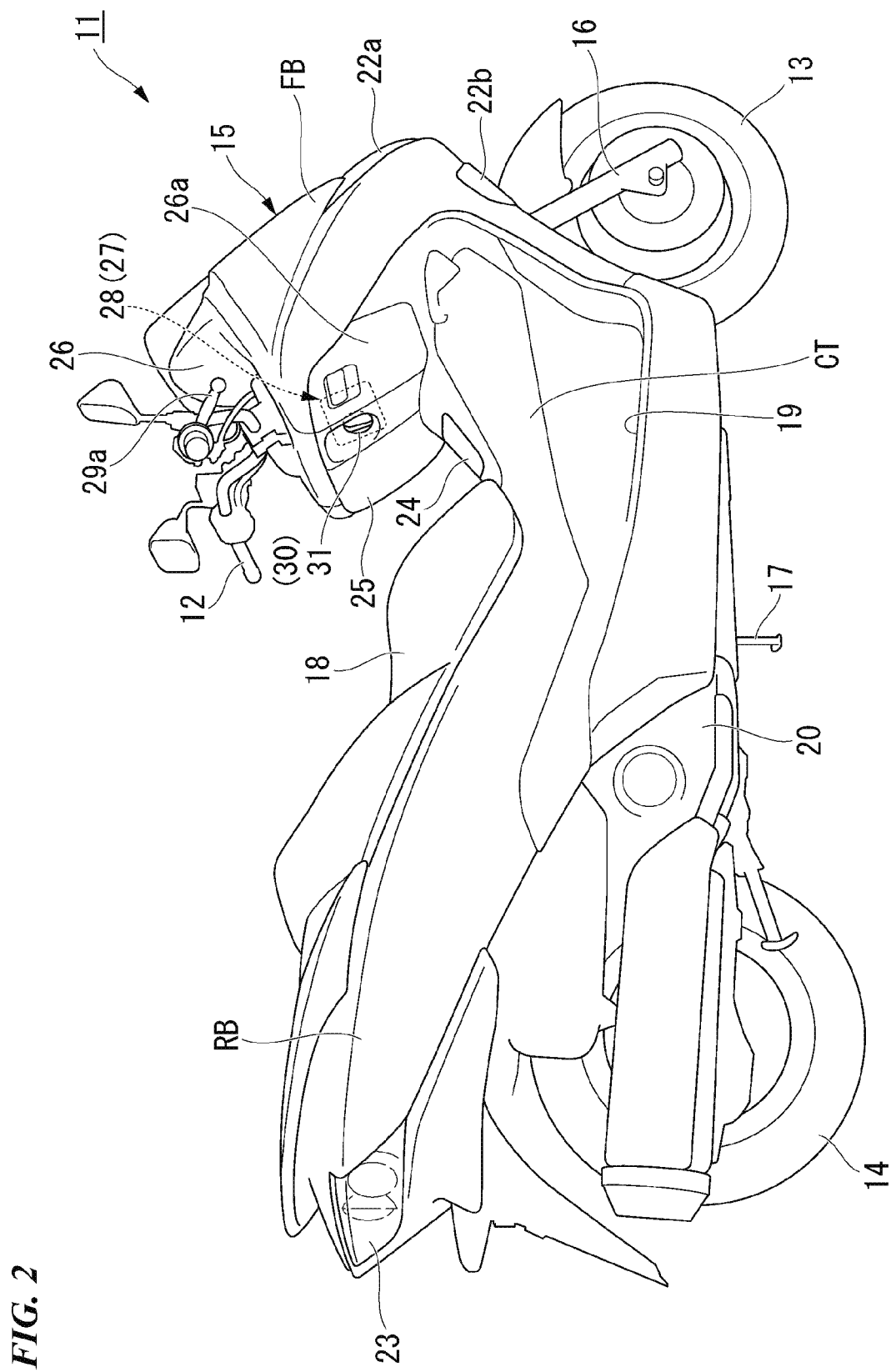
FIG. 2 is a perspective view of a motorcycle to which the vehicle control system is applied.

As illustrated in FIGS. 1 and 2, a vehicle control system 1 of the present embodiment includes a smart keying system 2. The smart keying system 2 is applied to a unit swing scooter-type motorcycle (a saddle-type vehicle) 11, for example.

<Overall Configuration of Vehicle>

As illustrated in FIG. 2, the motorcycle 11 includes a front wheel 13 which is a steering wheel and a rear wheel 14 which is a driving wheel. The front wheel 13 is supported by a front fork 16 and can be steered by a bar handle 12. The rear wheel 14 is supported by a swing unit 20 and can be driven by a reciprocating engine (an internal combustion engine, hereinafter referred to simply as an engine) 21. The swing unit 20 includes the engine (see FIG. 1) 21 and a V-belt-type continuous variable transmission (not illustrated), for example, which are integrated with each other.

Steering system components including the bar handle 12, the front fork 16, and the front wheel 13 are steerably supported by a front end of a vehicle body frame (not illustrated). The swing unit 20 and the rear wheel 14 are supported by a lower rear part of the vehicle body frame to swing vertically. A side stand 17 that supports the vehicle body in a standing posture inclined to the left side is storably provided on the lower left side of the vehicle body frame. The periphery of the vehicle body frame is covered by a vehicle body cover 15.

The motorcycle 11 includes a pair of left and right step floors 19 on which a driver sitting on a seat 18 rests his or her legs, a center tunnel CT extending in a vehicle front-rear direction between the left and right step floors 19, a front body FB connected to the front side of the left and right step floors 19 and the center tunnel CT, and a rear body RB connected to the rear side of the left and right step floors 19 and the center tunnel CT.

A head lamp 22a and a front blinker 22b are disposed in a front upper part of the front body FB. A rear combination lamp 23 including a tail lamp, a brake lamp, and a rear blinker is disposed in a rear part of the rear body RB. The seat 18 on which an occupant sits is supported on the rear body RB. A fuel lid 24 that opens and closes the space for a fuel supply port is provided on the upper surface of the center tunnel CT.

The seat 18 pivots vertically about a hinge shaft disposed in a front end, for example, to open and close the upper part of the rear body RB. An article storage portion (not illustrated) is disposed under the seat 18. The occupant can sit on the seat 18 in a closed state (see FIG. 1) in which the seat 18 blocks the upper part of the rear body RB. The article storage portion under the seat 18 can be accessed in an open state in which the seat 18 opens the upper part of the rear body RB.

A meter panel 26 is disposed in an upper part of the front body FB. A handle lock module 27 is accommodated inside the front body FB. The handle lock module 27 includes a handle lock mechanism 28 which is a main body, a smart control unit 3 to be described later, and a main switch 30 which is a main power switch of the motorcycle 11, which are integrated with each other.

Figure 3:
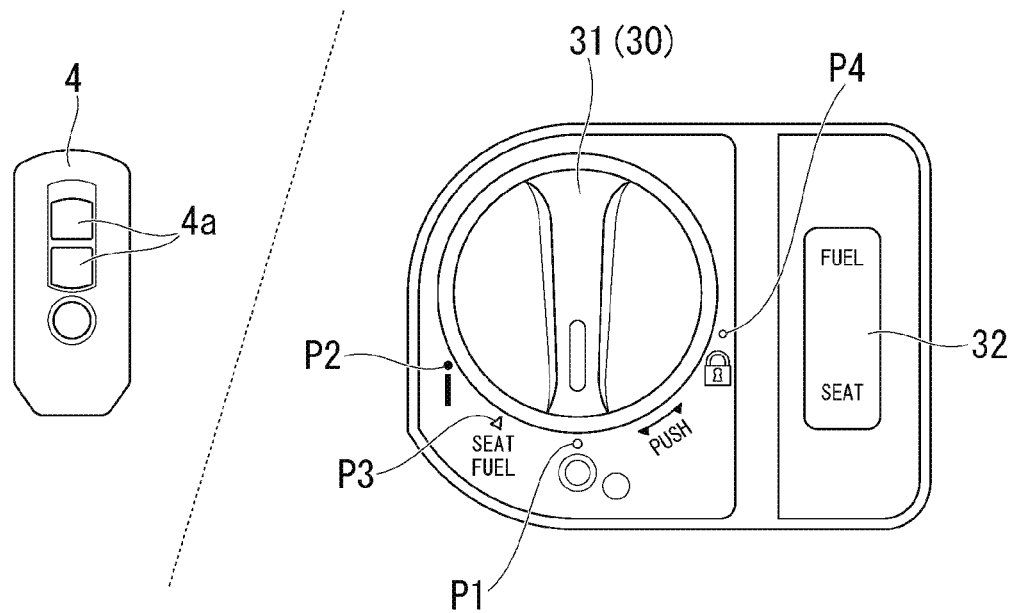
FIG. 3 is an explanatory diagram of a main switch knob and a smart key of the motorcycle.

Referring also to FIG. 3, the main switch 30 has a main switch knob 31 as an operating part disposed in an inner panel 25 close to the step floor 19 (the rear side) of the front body FB. A turning operation of the main switch knob 31 is possible or enabled in a state in which the ID of the smart key (remote key) 4 to be described later is authenticated. The main switch 30 is turned on according to a turning operation of the main switch knob 31. When the main switch 30 is turned on, electric power is supplied to a controller 40 to be described later. In this way, the engine 21 can be started, and an electromagnetic lock (an electric lock device operated by a solenoid) of the opening/closing body such as the seat 18 or the fuel lid 24 can be unlocked. The main switch knob 31 also serves as an operator for locking and unlocking the handle lock mechanism 28.

<Smart Keying System>

As illustrated in FIG. 1, the motorcycle 11 includes the smart keying system 2 that enables each part of the vehicle to be locked and unlocked.

The smart keying system 2 performs bidirectional communication between the smart key (a mobile device, a FOB key) 4 held by the driver and the smart control unit (an onboard device, a SCU) 3 mounted on the vehicle body of the motorcycle 11 to authenticate the ID of the smart key 4. When the ID of the smart key 4 is authenticated, the smart keying system 2 enables the engine 21 to be started and each part of the vehicle to be unlocked.

Figure 4:
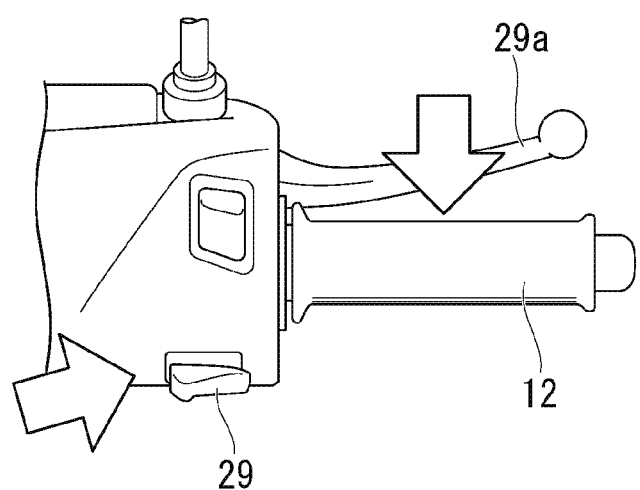
FIG. 4 is an explanatory diagram around a starter switch of the motorcycle.

Referring also to FIG. 4, the engine 21 is started when the main switch 30 is in the ON state, and the driver grasps a brake lever 29a on the right side of the bar handle 12 and presses the starter switch 29. When the starter switch 29 is pressed, an engine starting control part 42 of the controller 40 drives a starter motor 21a attached to the engine 21 and controls ignition and fuel injection to start the engine 21. The ON operation (turning to an ON position P2) of the main switch knob 31 is possible or enabled (unlocked state) by authentication of the ID of the smart key 4, and is impossible or disabled (locked state) when the smart key 4 is moved away from the vehicle and the communication between the smart key 4 and the motorcycle 11 is lost. Examples of the equipment unlocked and locked by the turning the main switch 30 on and off include the handle lock mechanism 28, the lock of the seat 18, the lock of a storage portion lid 26a disposed in the inner panel 25, and the lock of the fuel lid 24.

When the smart key 4 in a power-on state enters a prescribed authentication area, the smart keying system 2 performs bidirectional communication between the smart key 4 and the smart control unit 3, triggered by an operation such as, for example, pressing of the main switch knob 31 or pressing of an operation button 4a of the smart key 4. With this bidirectional communication, the smart control unit 3 reads the ID information of the smart key 4 to authenticate the smart key 4. The authentication area is a range of a radius of approximately 2 m from the center of the vehicle body, for example. When the smart key 4 is authenticated, the main switch knob 31 can be turned on, the handle lock is unlocked and the lock of each part of the vehicle can be unlocked.

The smart keying system 2 stops the communication between the smart key 4 and the smart control unit 3 when the smart key 4 exits the authentication area or the smart key 4 is powered off. The smart keying system 2 also stops the communication between the smart key 4 and the smart control unit 3 according to an OFF operation (an operation of turning to an OFF position P1) of the main switch knob 31.

The main switch knob 31 has an OFF position P1 at which the main switch 30 is put into an OFF state, an ON position P2 at which the main switch 30 is put into an ON state, a seat and fuel unlock position P3 which is located between the OFF position P1 and the ON position P2 and at which an operation of opening the seat 18 and the fuel lid 24 is enabled, and a lock position P4 at which the main switch knob 31 is turned in response to pressing from the OFF position P1 to a side opposite the ON position P2 whereby the lock of each part of the vehicle including the handle lock is put into a locked state. When the main switch knob 31 is at the seat and fuel unlock position P3, an operation of a seat and fuel unlock switch 32 adjacent to the main switch knob 31 is possible or enabled.

The smart control unit 3 is connected to a transmission antenna and a receiving unit for performing communication with the smart key 4, the controller 40, a lock device of each part of the vehicle, and a notification driving device that activates various notification units according to activation of the smart keying system 2 (only the controller 40 is illustrated in FIG. 1). The notification driving device executes (answers back with) at least one of a visual sign such as blinking a hazard lamp and an audio sign such as playing an electronic sound, for example, when the smart keying system 2 locks and unlocks the lock device of each part of the vehicle. In this way, the user understands that the lock device of each part of the vehicle is locked and unlocked.

The controller 40 is an integrated electric control unit (ECU), for example, and functions as a control part of the entire control system 1. An ON signal from the main switch 30 and an engine start signal from the starter switch 29 are input to the controller 40 via the smart control unit 3. Moreover, a stand use detection signal from a side stand switch 17a for detecting a standing state of the side stand 17 and various detection signals for detecting an operating state of the engine 21 are input to the controller 40. Hereinafter, the controller 40 is sometimes referred to as an engine control unit 40. Moreover, the smart control unit 3 and the engine control unit 40 are collectively referred to as a controller 40A.

The controller 40 includes an engine control part 41 that controls driving of the engine 21, an engine starting control part 42 that controls starting of the engine 21, an operation state detection and determination part 43 that detects and determines an operating state of the engine 21, a stand use control part 44 that controls stopping of the engine 21 during use of the side stand 17, an idle stop control part 45 that controls idle stop of the engine 21, and a communication state detection and determination unit 46 that detects and determines a communication state between the smart key 4 and the smart control unit 3.

Although the respective units included in the controller 40 are realized by execution of programs, for example, the respective units may each be configured as hardware including one or more electric components. Moreover, the controller 40 itself may be divided into a plurality of units and may be a means realized by execution of programs.

<Conventional Smart Keying System>

A conventional smart keying system has the following problems.

That is, for example, a case in which, after a user possessing the smart key 4 turns the main switch knob 31 to put the main switch 30 into the ON state after ID authentication, the user leaves the motorcycle 11 before starting the engine 21 without turning off the main switch 30 is assumed. In this case, in the conventional smart keying system, in a situation where the user possessing the smart key 4 is absent, a third party can start the engine 21 by operating the starter switch 29.

Moreover, a case in which, after a user possessing the smart key 4 runs the motorcycle 11 by driving the engine 21, the user puts the side stand 17 in a standing state, stops the engine 21 without turning off the main switch 30, and leaves the motorcycle 11 in a stopped state using the side stand 17 is assumed. In this case, in the conventional smart keying system, a third party can start the engine 21 similarly to the above case.

In view of such a problem, in the smart keying system 2 of the present embodiment, control is performed such that, even after the smart key 4 is authenticated and the main switch 30 is in the ON state, the starting of the engine 21 is disabled when communication with the smart key 4 is lost, for example, due to the smart key 4 being moved away from the authentication area.

Furthermore, in the conventional smart keying system, a case in which a user possessing the smart key 4 drops and loses the smart key 4 during traveling of the motorcycle 11 and stops the engine 21 by turning off the main switch 30, for example, without noticing that the smart key 4 is lost is assumed. In this case, in the conventional smart keying system, it is not possible to restart the engine 21 since the smart key 4 cannot be authenticated.

In view of such a problem, in the smart keying system 2 of the present embodiment, control is performed such that, even when the engine 21 is stopped, for example, by turning off the main switch 30 after the communication with the smart key 4 is lost during traveling of the motorcycle 11, restarting of the engine 21 is enabled under a prescribed condition.

<Control Flow>

Next, processing performed by the controller 40A will be described with reference to the flowcharts of FIGS. 5 and 6.

Figure 5:
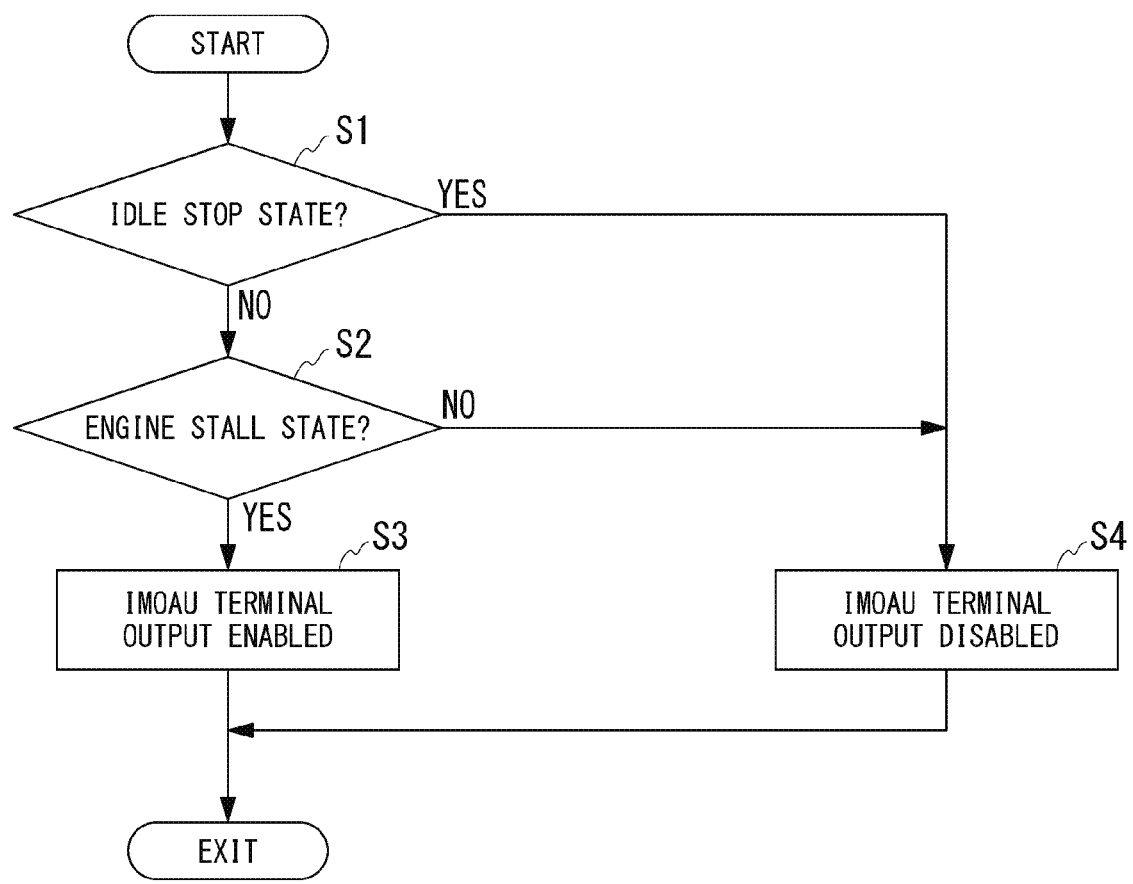
FIG. 5 is a flowchart illustrating a first control flow of the vehicle control system.

The control illustrated in FIG. 5 is control of the engine control unit 40 for disabling the starting of the engine when communication of the smart key 4 is disabled while the engine is stopped and the main switch 30 is in the ON state. The control illustrated in FIG. 6 is control of the smart control unit 3 for enabling the starting of the engine under a prescribed condition even when the engine stops after communication of the smart key 4 is disabled during driving of the engine.

First, the control flow of FIG. 5 will be described. This control flow is executed when the main switch 30 is in the ON state (that is, the controller 40A is in the ON state). First, in the control flow, it is determined whether the present state of the engine 21 is an idle stop state (step S1). This determination is made based on whether the idle stop control part 45 is operating. When the engine 21 is in the idle stop state (step S1: YES), the output of an IMOAU terminal stops (step S4). The output of the IMOAU terminal is a signal transmitted from the engine control unit 40 to the smart control unit 3, indicating that the engine is not idly stopped but in an engine stop state (an engine stall state or a stopped state).

In the case of NO (not idle stop state) in step S1, the flow proceeds to step S2 and it is determined whether the present state of the engine 21 is an engine stall state. This is determined by the operation state detection and determination part 43 determining whether an operating state of the engine 21 is equal to or larger than a prescribed engine stall determination value (for example, whether an engine's speed is equal to or larger than an idling speed).

Figure 7:
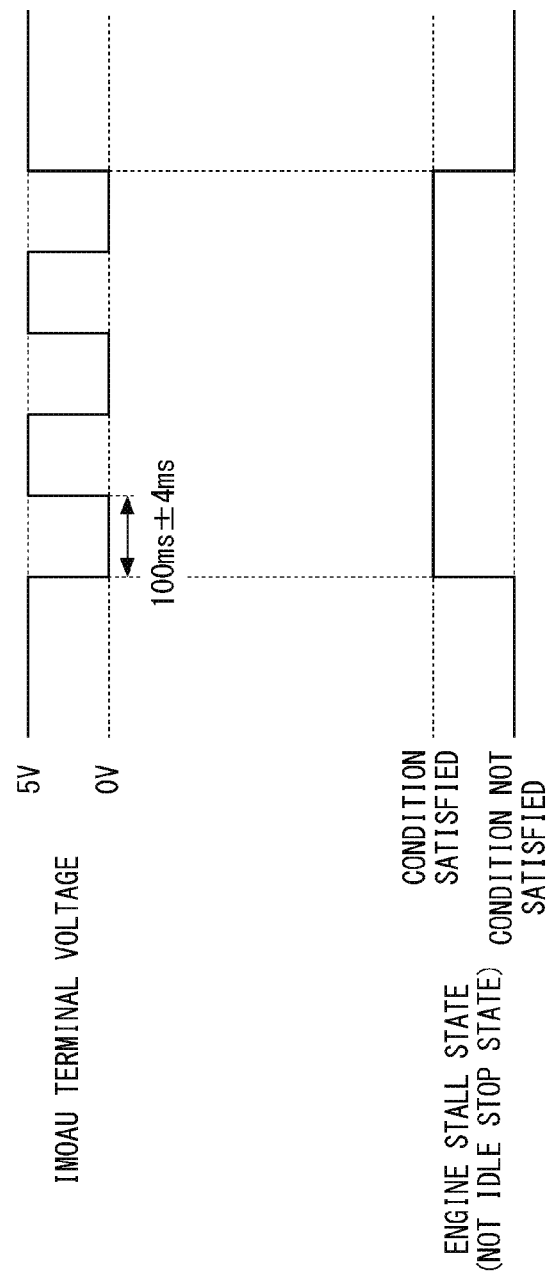
FIG. 7 is a graph illustrating the output of an IMOAU terminal of the vehicle control system.

Referring also to FIG. 7, when the engine 21 is in the engine stall state (step S2: YES), that is, when a condition that the engine 21 is not in the idle stop state but the engine stall state is satisfied, the IMOAU terminal outputs a rectangular wave of 100 ms±4 ms (step S3).

The controller 40A disables the starting of the engine 21 when the output of the IMOAU terminal is present and the communication with the smart key 4 is disabled. In this way, the starting of the engine by a third party is prevented even when the user moves away from the motorcycle 11 without turning off the main switch 30 (in a state where the controller 40A is in the ON state), and anti-theft performance and convenience are improved.

Figure 6:
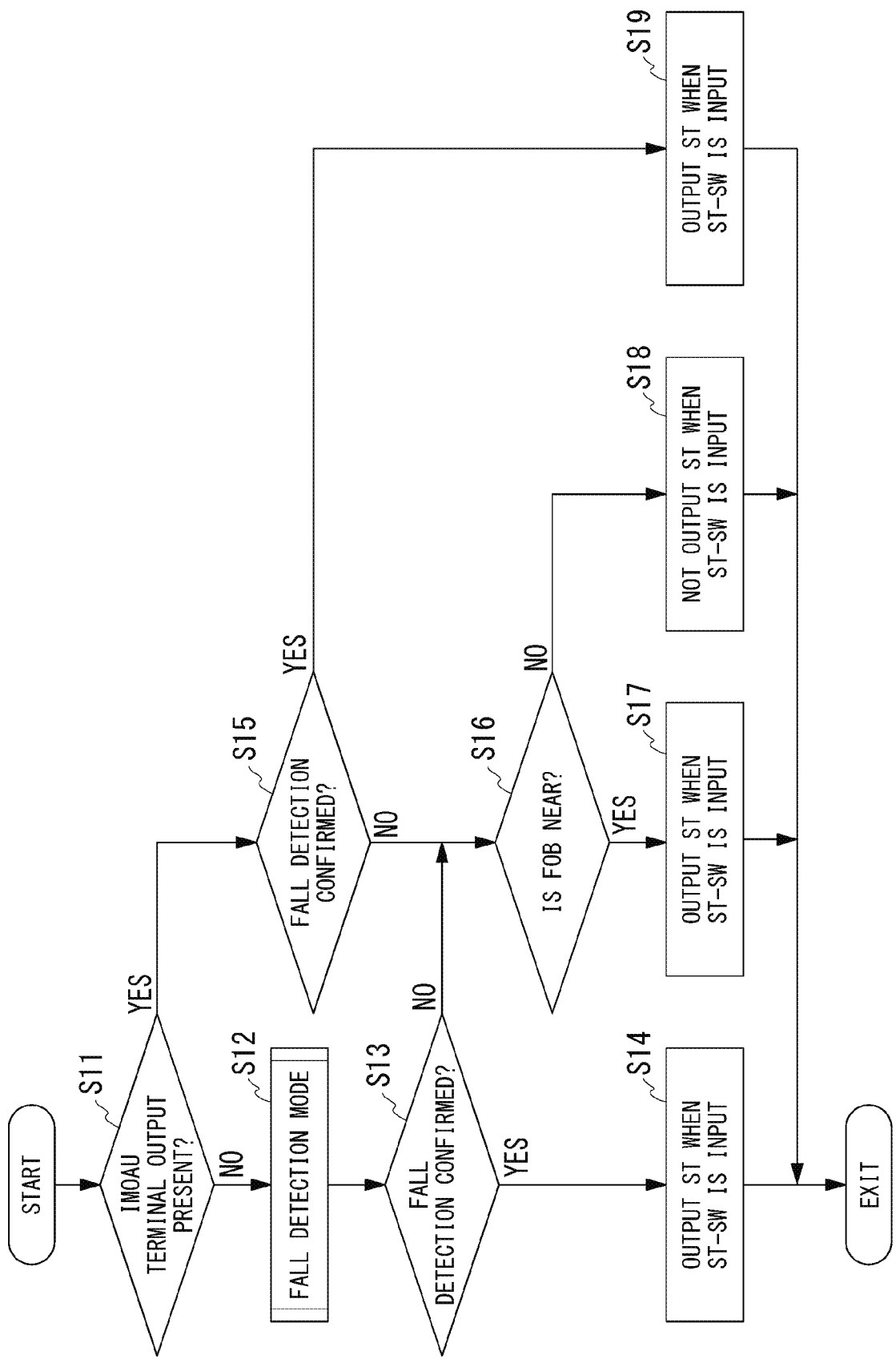
FIG. 6 is a flowchart illustrating a second control flow of the vehicle control system.

The smart control unit 3 having received the output of the IMOAU terminal starts the control illustrated in FIG. 6. That is, first, the smart control unit 3 determines whether the output of the IMOAU terminal is present (step S11). This determination corresponds to determining whether the engine is in the stopped state due to the use of the side stand 17, for example. In this case, in step S11, it is determined whether the stand use control part 44 is operating. It is assumed that the controller 40A stops the output of the IMOAU terminal when the side stand 17 is not lowered (in a storage state).

In the case of NO (IMOAU terminal output absent) in step S11, the flow proceeds to step S12, and a fall detection mode of detecting the falling of the smart key 4 is executed. In the fall detection mode, the smart control unit 3 determines whether it is possible to communicate with the smart key 4. The condition for the smart control unit 3 to proceed to the fall detection mode may include that the communication with the smart key 4 is lost when the operating state of the engine 21 or the vehicle speed is equal to or larger than a prescribed value (during a traveling state). The smart control unit 3 may include a communication state detection and determination part 46.

Subsequently, it is determined in step S13 whether the fall detection is confirmed. For example, the smart control unit 3 confirms the fall detection of the smart key 4 when the state of being unable to communicate with the smart key 4 continues for a prescribed period of approximately 10 seconds or longer. When the fall detection is confirmed (step S13: YES), the flow proceeds to step S14, and a starter signal (a signal for driving the starter motor 21a) is output when the starter switch 29 is input (pressed). In this way, cranking of the engine 21 is realized and the engine 21 is started.

When the fall detection is not confirmed (step S13: NO), the flow proceeds to step S16 and it is determined whether the smart key 4 is authenticated (whether the smart key 4 is near (within the authentication area)). The controller 40A stops other processing until authentication of the smart key 4 is completed.

In the case of YES (the smart key 4 is near) in step S16, the flow proceeds to step S17, and similarly to step S14, a starter signal is output to start the engine 21 when the starter switch 29 is input.

In the case of NO (the smart key 4 is not near) in step S16, the flow proceeds to step S18, and the starter signal is not output even when the starter switch 29 is input and the starting of the engine 21 is disabled.

Returning to step S11, in case of YES (the side stand 17 is lowered and the engine is in the stopped state) in step S11, the flow proceeds to step S15 and it is determined whether the fall detection of the smart key 4 is confirmed. When the fall detection is confirmed (step S15: YES), the flow proceeds to step S19, and similarly to steps S14 and S17, the starter signal is output to start the engine 21 when the starter switch 29 is input. When the fall detection is not confirmed (step S15: NO), the flow proceeds to step S16 and the processing described above is performed.

For example, the controller 40A blinks an indicator lamp in a meter panel 26 when the fall detection of the smart key 4 is confirmed. In this way, the user is notified of falling of the smart key 4.

When the fall detection of the smart key 4 is confirmed and the main switch 30 is turned off in a stopped state, for example, the controller 40A blinks a hazard lamp or plays a buzzer, for example, in addition to the indicator lamp. In this way, the user is strongly notified of the falling of the smart key 4 (a notification state).

When locking (the main switch 30 is turned off) is realized in the notification state, for example, locking is realized on condition that the starter switch 29 is long-pressed for a prescribed period of approximately 2 seconds or longer or a prescribed period of approximately 20 seconds or longer is elapsed in the notification state.

When the main switch 30 is returned to the ON state from the notification state and an engine starting operation is performed (the starter switch 29 is pressed while grasping the brake lever 29a), a starter signal is output without authentication to start the engine 21. When the main switch 30 is returned to the ON state from the notification state, some of the notifications is continued (for example, playing of a buzzer), for example (a light notification state).

When the fall detection of the smart key 4 is confirmed and the side stand 17 is lowered to stop the engine 21 in a stopped state, the light notification state is realized and the user is notified of the falling of the smart key 4. After that, when the side stand 17 is raised (stored), the light notification state disappears, and when an engine starting operation is performed in this state (the starter switch 29 is pressed while grasping the brake lever 29a), the starter signal is output without authentication to start the engine 21.

As described above, after the fall detection of the smart key 4 is confirmed during traveling of the motorcycle 11, even when the engine 21 is stopped by turning off the main switch 30, for example, it is possible to restart the engine 21 under a prescribed condition.

The "prescribed condition" includes either "prescribed state" or "prescribed operation" to be described later. Examples of the "prescribed state" include a stopped state after the communication with the smart key 4 is lost during traveling and a period within a prescribed period from the stopping of the engine 21. Examples of the "prescribed operation" include multiple repeated operations on existing operators such as the starter switch 29, an accelerator grip, a brake operator, and a clutch operator and an operation on a dedicated restart operator in addition to long-pressing of the starter switch 29.

As described above, the vehicle control system 1 of the present embodiment includes the smart keying system 2 that performs authentication by communication between the motorcycle 11 and the smart key 4 within a prescribed authentication area, the main switch 30 that can be turned on during authentication of the smart keying system 2, the controller 40A that enters an ON state according to an operation of turning on the main switch 30 to control the motorcycle 11, and the starter motor 21a that starts the engine 21 of the motorcycle 11 when the controller 40A is in the ON state, the controller 40A includes the operation state detection and determination part 43 that determines an operating state of the engine 21 and the communication state detection and determination part 46 that determines a communication state between the smart keying system 2 and the smart key 4, the controller 40A disables the starting of the engine 21 by the starter motor 21a when the controller 40A is in the ON state, the operation state detection and determination part 43 determines that the engine 21 is in a non-operating state, and the communication state detection and determination part 46 determines that the communication with the smart key 4 is lost.

According to this configuration, it is possible to prevent the engine 21 from being started when the smart key 4 is not authenticated due to the user possessing the smart key 4 moving away (exiting the authentication area) the motorcycle 11 even when the controller 40A is in the ON state during temporary stopping of the engine 21 or before starting of the engine 21. That is, the starting of the engine 21 is disabled when the smart key 4 is not authenticated by the smart keying system 2 even when the controller 40A is not turned off. Therefore, it is possible to prevent the engine 21 from being started by a third party and improve anti-theft performance and convenience even when the user moves away from the motorcycle 11 in the ON state of the controller 40A.

In addition, in the vehicle control system 1, the controller 40A includes the stand use control part 44 that stops the engine 21 when the side stand 17 that locks the motorcycle 11 is used, and the controller 40A disables the starting of the engine 21 by the starter motor 21a when the stand use control part 44 stops the engine 21 and the communication state detection and determination part 46 determines that the communication with the smart key 4 is lost.

According to this configuration, it is possible to prevent the engine 21 from being started when the smart key 4 is not authenticated due to the user possessing the smart key 4 moving away from the motorcycle 11 in a stopped state of the engine 21 due to the use of the side stand 17. Therefore, it is possible to prevent the engine 21 from being started by a third party and improve anti-theft performance and convenience even when the user moves away from the motorcycle 11 in the ON state of the controller 40A.

In addition, in the vehicle control system 1, the controller 40A enables the starting of the engine 21 by the starter motor 21a under a prescribed condition when the engine 21 is stopped and the communication state detection and determination part 46 determines that the communication with the smart key 4 is lost during driving of the engine 21.

According to this configuration, it is possible to restart the engine 21 under a prescribed condition when it is detected that the communication with the smart key 4 is stopped due to falling and loss of the smart key 4 during traveling. Therefore, it is possible to enable restarting of the engine 21 and improve convenience when the engine 21 is stopped without noticing that the smart key 4 is lost.

In addition, in the vehicle control system 1, the controller 40A determines whether the communication with the smart key 4 is lost when the operating state of the engine 21 is equal to or larger than a prescribed value.

According to this configuration, it is possible to alleviate the processing load of the controller 40A by limiting the fall determination of the smart key 4 to the prescribed value or more corresponding to the traveling of the motorcycle 11. Moreover, it is possible to enhance the reliability of the fall determination of the smart key 4 by distinguishing from a situation in which the user possessing the smart key 4 moves away from the motorcycle 11 when the vehicle is stopped.

In addition, in the vehicle control system 1, the engine 21 is an internal combustion engine, the controller 40A includes the idle stop control part 45 that automatically stops the internal combustion engine, and the controller 40A disables the starting of the engine 21 by the starter motor 21a when the operation state detection and determination part 43 determines that the engine 21 is in the non-operating state which is not realized by the idle stop control part 45, and the communication state detection and determination part 46 determines that the communication with the smart key 4 is lost.

According to this configuration, it is possible to disable the starting of the engine 21 when the smart key 4 is not authenticated and the internal combustion engine is not in the idle stop state only. In this way, it is possible to provide a satisfactory traveling environment and improve the marketability of the motorcycle 11 without disturbing the restarting of the internal combustion engine after the idle stop.

The present invention is not limited to the above-described embodiment, and for example, the present system can be broadly applied to saddle-type vehicles without being limited to the motorcycles. The saddle-type vehicle includes all vehicles that a driver rides across the vehicle body, and includes not only motorcycles (including a motorized bicycle and a scooter-type vehicle) but also three-wheel vehicles (including vehicles with two front wheels and one rear wheel as well as vehicles with one front wheel and two rear wheels) or four-wheel vehicles. Moreover, the present system may be applied to automobiles having a passenger compartment.

The configuration of the above-described embodiment is an example of the present invention, and various changes can be made without departing from the spirit of the present invention such as substitutions of the components of the embodiment with well-known components.

BRIEF DESCRIPTION OF THE REFERENCE SYMBOLS

1: Vehicle control system
2: Smart keying system (Authentication unit)
3: Smart control unit
4: Smart key (Remote key)
11: Motorcycle (Vehicle)
17: Side stand (Stand)
21: Engine (Driving source, Internal combustion engine)
21a: Starter motor (Driving source starting unit)
30: Main switch
31: Main switch knob
40A: Controller (Control unit)
40: Controller (Engine control unit)
43: Operation state detection and determination part (Operation state determination unit)
44: Stand use control part (Stand use control unit)
45: Idle stop control part (Idle stop control unit)
46: Communication state detection and determination part (Communication state determination unit)

What is claimed is:

1. A vehicle control system comprising:
an authentication unit that performs authentication by communication between a vehicle and a remote key within a prescribed authentication area;
a main switch that can be turned on during authentication of the authentication unit;
a control unit that enters an ON state when the main switch is turned on to control the vehicle; and
a driving source starting unit that starts a driving source of the vehicle when the control unit is in the ON state,
wherein the control unit comprises:
an operation state determination unit that determines an operating state of the driving source; and
a communication state determination unit that determines a communication state between the authentication unit and the remote key,
wherein the control unit disables a starting of the driving source by the driving source starting unit when the control unit is in the ON state, the operation state determination unit determines that the driving source is in a non-operating state without operating the main switch, and the communication state determination unit determines that the communication with the remote key is lost.

2. The vehicle control system according to claim 1, wherein
the control unit comprises a stand use control unit that stops the driving source when a stand for locking the vehicle is used, and
the control unit disables the starting of the driving source by the driving source starting unit when the stand use control unit stops the driving source and the communication state determination unit determines that the communication with the remote key is lost.

3. The vehicle control system according to claim 1, wherein the control unit enables the starting of the driving source by the driving source starting unit under a prescribed condition when the communication state determination unit determines that the communication with the remote key is lost during driving of the driving source and the driving source is stopped.

4. The vehicle control system according to claim 2, wherein the control unit enables the starting of the driving source by the driving source starting unit under a prescribed condition when the communication state determination unit determines that the communication with the remote key is lost during driving of the driving source and the driving source is stopped.

5. The vehicle control system according to claim 3, wherein the control unit determines whether the communication with the remote key is lost when an operating state of the driving source is equal to or larger than a prescribed value.

6. The vehicle control system according to claim 4, wherein the control unit determines whether the communication with the remote key is lost when an operating state of the driving source is equal to or larger than a prescribed value.

7. The vehicle control system according to claim 1, wherein
the driving source is an internal combustion engine,
the control unit comprises an idle stop control unit that automatically stops the internal combustion engine, and
the control unit disables the starting of the driving source by the driving source starting unit when the operation state determination unit determines that the driving source is in a non-operating state which is not realized by the idle stop control unit, and the communication state determination unit determines that the communication with the remote key is lost.

8. The vehicle control system according to claim 2, wherein
the driving source is an internal combustion engine,
the control unit comprises an idle stop control unit that automatically stops the internal combustion engine, and
the control unit disables the starting of the driving source by the driving source starting unit when the operation state determination unit determines that the driving source is in a non-operating state which is not realized by the idle stop control unit, and the communication state determination unit determines that the communication with the remote key is lost.

9. The vehicle control system according to claim 3, wherein
the driving source is an internal combustion engine,
the control unit comprises an idle stop control unit that automatically stops the internal combustion engine, and
the control unit disables the starting of the driving source by the driving source starting unit when the operation state determination unit determines that the driving source is in a non-operating state which is not realized by the idle stop control unit, and the communication state determination unit determines that the communication with the remote key is lost.

10. The vehicle control system according to claim 4, wherein
the driving source is an internal combustion engine,
the control unit comprises an idle stop control unit that automatically stops the internal combustion engine, and
the control unit disables the starting of the driving source by the driving source starting unit when the operation state determination unit determines that the driving source is in a non-operating state which is not realized by the idle stop control unit, and the communication state determination unit determines that the communication with the remote key is lost.

11. The vehicle control system according to claim 5, wherein the driving source is an internal combustion engine, the control unit comprises an idle stop control unit that automatically stops the internal combustion engine, and the control unit disables the starting of the driving source by the driving source starting unit when the operation state determination unit determines that the driving source is in a non-operating state which is not realized by the idle stop control unit, and the communication state determination unit determines that the communication with the remote key is lost.

12. The vehicle control system according to claim 6, wherein the driving source is an internal combustion engine, the control unit comprises an idle stop control unit that automatically stops the internal combustion engine, and the control unit disables the starting of the driving source by the driving source starting unit when the operation state determination unit determines that the driving source is in a non-operating state which is not realized by the idle stop control unit, and the communication state determination unit determines that the communication with the remote key is lost.

* * * * *